United States Patent
Nowicki et al.

(10) Patent No.: US 7,298,925 B2
(45) Date of Patent: Nov. 20, 2007

(54) EFFICIENT SCALING IN TRANSFORM DOMAIN

(75) Inventors: Tomasz J. Nowicki, Briarcliff Manor, NY (US); Marco Martens, Groningen (NL); Jennifer Q. Trelewicz, Gilroy, CA (US); Timothy J. Trenary, Berthoud, CO (US); Joan L. Mitchell, Longmont, CO (US); Michael T. Brady, Ithaca, NY (US)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 10/675,094

(22) Filed: Sep. 30, 2003

(65) Prior Publication Data
US 2005/0069224 A1 Mar. 31, 2005

(51) Int. Cl.
*G06K 9/32* (2006.01)

(52) U.S. Cl. ...................... 382/298; 382/235

(58) Field of Classification Search ............... 382/100, 382/166, 169, 232, 240, 243, 244, 248, 250, 382/255, 276, 277, 280, 281, 293, 298, 302; 345/70, 645, 55, 603
See application file for complete search history.

(56) References Cited

U.S. PATENT DOCUMENTS 5,345,408 A * 9/1994 Hoogenboom ............... 708/402
5,434,931 A   7/1995 Quardt et al. ............... 382/271

(Continued)

FOREIGN PATENT DOCUMENTS

JP        4188932        7/1992
JP     2000312294      11/2000

OTHER PUBLICATIONS

"A New Multidimensional Recursive Architecture for Computing the Discrete Cosine Transform", Elnaggar et al, IEEE Transactions on Circuits and Systems for Video Technology, vol. 10, Issue 1, Feb. 2000, pp. 113-119.

(Continued)

*Primary Examiner*—Samir Ahmed
*Assistant Examiner*—Abolfazl Tabatabai
(74) *Attorney, Agent, or Firm*—Patrick J. Daugherty; Driggs, Hogg & Fry Co., LPA

(57) ABSTRACT

A method and system for efficient scaling in the transform domain, wherein transform coefficient data is provided as an input to a data processing system and scaled in the transform domain by application of a combined matrix. Some embodiments utilize discrete cosine transform data. One embodiment of the invention generates a combined matrix for one-dimensional scaling by selecting a rational scaling factor and matrix dimension value, generating a matrix with some zero values, applying a one-dimensional inverse transform, regrouping, and applying a one-dimensional forward transform. One application of the invention performs up-scaling operations, and another performs down-scaling operations. The invention also provides for two-dimensional scaling by selecting horizontal and vertical scaling parameters and generating first and second combined matrices responsive to the parameters and combining them into a single combined matrix. The invention may also incorporate a predetermined cost function.

24 Claims, 3 Drawing Sheets

U.S. PATENT DOCUMENTS

| | | | | |
|---|---|---|---|---|
| 5,452,104 | A | | 9/1995 | Lee .......................... 358/433 |
| 5,572,236 | A | * | 11/1996 | Feig et al. .................. 345/603 |
| 5,719,964 | A | | 2/1998 | Linzer et al. ............... 382/250 |
| 5,774,598 | A | * | 6/1998 | Sunshine et al. ........... 382/250 |
| 6,002,809 | A | * | 12/1999 | Feig et al. .................. 382/298 |
| 6,058,215 | A | * | 5/2000 | Schwartz et al. ........... 382/244 |
| 6,092,920 | A | * | 7/2000 | Sakamoto ................... 708/401 |
| 6,215,909 | B1 | * | 4/2001 | Chang et al. ............... 382/250 |

OTHER PUBLICATIONS

"Quantized Discrete Cosine Transform: a Combination of DCT and Scalar Quantization", Khanh Nguyen-Phi Docef et al, IEEE International Conference on Acoustics, Speech, and Signal Processing, 1999, vol. 6, pp. 3197-3200.

Dossier YOR919990313, "Shift and/or Merge of Transformed Data Along One Axis", Micchelli et al, Mar. 13, 2000.

Dossier YOR910000005, "Hybrid Domain Processing of Multi-Dimensional Transformed Data", Mitchell et al, Jun. 7, 2000.

"3-to-1 Scaling in the DCT Domain", Research Disclosure, No. 345, Jan. 1993.

IBM Technical Disclosure Bulletin, "Non-Commensurable Scaling Ratios Using Inverse/Forward/Inverse Transform Combination", vol. 38, No. 6, Jun. 1995, pp. 475-478.

IBM Technical Disclosure Bulletin "Transform Domain Scaling for Non-Commensurable Ratios", vol. 38, No. 6, Jun. 1995, pp. 3739.

* cited by examiner

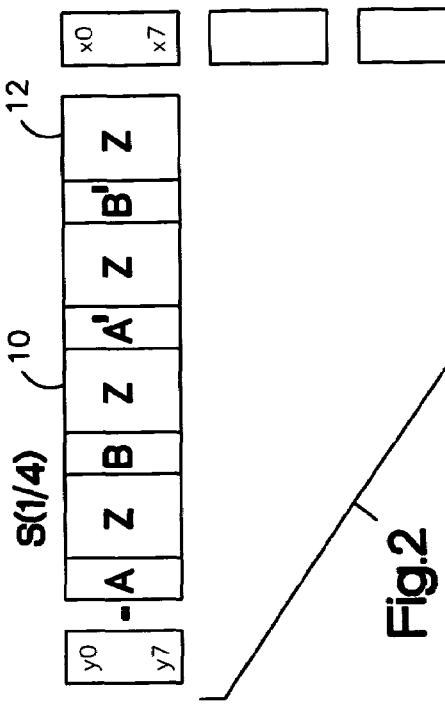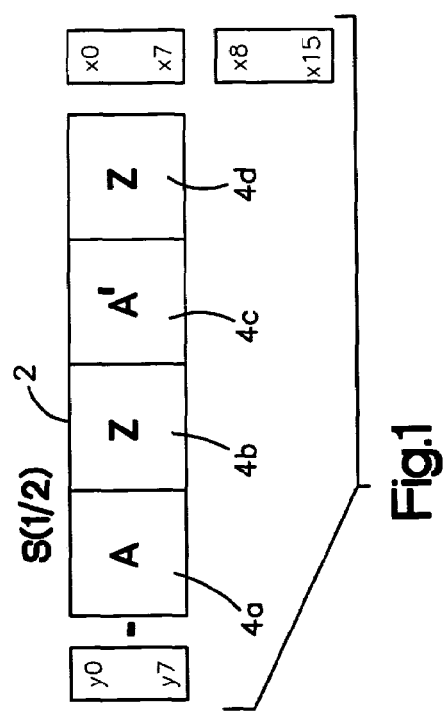

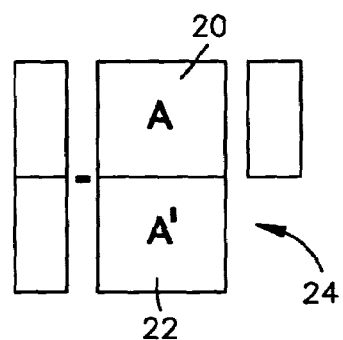

Fig.3

$$A = \begin{bmatrix} 32 & 29 & 0 & -10 & 0 & 5 & 0 & -4 \\ 0 & 14 & 32 & 25 & 0 & -9 & 0 & 6 \\ 0 & -3 & 0 & 17 & 34 & 20 & 0 & -8 \\ 0 & 1 & 0 & -4 & 0 & 16 & 36 & 20 \\ 0 & -1 & 0 & 2 & 0 & -4 & 0 & 16 \\ 0 & 0 & 0 & -1 & 0 & 2 & 0 & -4 \\ 0 & 0 & 0 & 1 & 0 & -1 & 0 & -2 \\ 0 & 0 & 0 & 0 & 0 & 0 & 0 & -1 \end{bmatrix}$$

Fig.3A

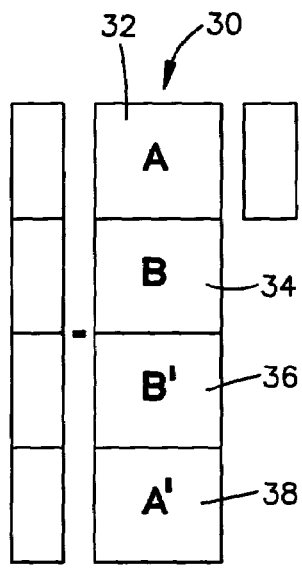

Fig.4

$$A = \begin{bmatrix} 32 & 41 & 29 & 14 & 0 & -5 & -10 & -6 \\ 0 & 4 & 14 & 25 & 48 & 20 & 25 & 12 \\ 0 & -1 & -3 & -3 & 0 & 5 & 17 & 25 \\ 0 & 0 & 1 & 1 & 0 & -1 & -4 & -4 \\ 0 & 0 & -1 & -1 & 0 & 1 & 2 & 2 \\ 0 & 0 & 0 & 0 & 0 & 0 & -1 & -1 \\ 0 & 0 & 0 & 0 & 0 & 0 & -1 & 0 \\ 0 & 0 & 0 & 0 & 0 & 0 & 0 & 0 \end{bmatrix}$$

$$B = \begin{bmatrix} 32 & 17 & -29 & -33 & 0 & 12 & 10 & -2 \\ 0 & 9 & 14 & -10 & -48 & -8 & 25 & 28 \\ 0 & 0 & 3 & 7 & 0 & -11 & -17 & 10 \\ 0 & 1 & 1 & 0 & 0 & 1 & -4 & -9 \\ 0 & 0 & 1 & 1 & 0 & -2 & -2 & 1 \\ 0 & 0 & 0 & 0 & 0 & 0 & -1 & -2 \\ 0 & 0 & 0 & 0 & 0 & 0 & -1 & 0 \\ 0 & 0 & 0 & 0 & 0 & 0 & 0 & 0 \end{bmatrix}$$

Fig.4A

EFFICIENT SCALING IN TRANSFORM DOMAIN

CROSS-REFERENCE TO RELATED APPLICATIONS

The present application is related to the following co-pending and commonly assigned United States patent applications, which are hereby incorporated by reference in their respective entirety: Ser. No. 09/675,779, filed Sep. 29, 2000, now U.S. Pat. No. 6,834,337 B1 by Mitchell et al. for "System and Method for Enabling Multiple Signed Independent Data Elements per Register"; Ser. No. 09/570,382 filed on May 12, 2000, now U.S. Pat. No. 6,970,179 B1 by T. J. Trenary et al. for "Method and Apparatus for the Sealing Up of Data"; Ser. No. 09/570,849 filed on May 12, 2000, now U.S. Pat. No. 7,062,098 B1 by J. L. Mitchell et al. for "Method and Apparatus for the Sealing Down of Data"; Ser. No. 09/694,448, filed Oct. 23, 2000, now U.S. Pat. No. 6,766,341 B1 by Trelewicz et al. for "Faster Transforms Using Scaled Terms"; Ser. No. 09/535,587, filed Mar. 27, 2000, now U.S. Pat. No. 7,064,859 B1 by D. K. Dittrich et al for "Method, System, Program, and Data Structure for Producing a Look-Up Table to Enhance Print Quality"; and Ser. No. 10/198,097, filed Jul. 19, 2002, now U.S. Pat. No. 7,099,523 B2 by Tomasz Nowicki et al for "Method and System for Scaling a Signal Sample Rate".

FIELD OF THE INVENTION

This invention relates in general to data processing, and more particularly to data transforms that use scaled terms. More particularly, the present invention addresses high-end color printer performance for scaling operations.

BACKGROUND OF THE INVENTION

Transforms, which take data from one domain (e.g., sampled data) to another (e.g., frequency space), are used in many signal and/or image processing applications. Such transforms are used for a variety of applications, including, but not limited to data analysis, feature identification and/or extraction, signal correlation, data compression, or data embedding. Many of these transforms require efficient implementation for real time and/or fast execution whether or not compression is used as part of the data processing.

Data compression is desirable in many data handling processes, where too much data is present for practical applications using the data. Commonly, compression is used in communication links, to reduce transmission time or required bandwidth. Similarly, compression is preferred in image storage systems, including digital printers and copiers, where "pages" of a document to be printed may be stored temporarily in memory. Here the amount of media space on which the image data is stored can be substantially reduced with compression. Generally speaking, scanned images, i.e., electronic representations of hard copy documents, are often large, and thus make desirable candidates for compression.

In data processing, data is typically represented as a sampled discrete function. The discrete representation is either made deterministically or statistically. In a deterministic representation, the point properties of the data are considered, whereas, in a statistical representation, the average properties of the data are specified. In particular examples referred to herein, the terms images and image processing will be used. However, those skilled in the art will recognize that the present invention is not meant to be limited to processing still images but is applicable to processing different data, such as audio data, scientific data, video data, sensor data, etc.

In a digital image processing system, digital image signals are formed by first dividing a two-dimensional image into a grid. Each picture element, or pixel, in the grid has associated therewith a number of visual characteristics, such as brightness and color. These characteristics are converted into numeric form. The digital image signal is then formed by assembling the numbers associated with each pixel in the image into a sequence which can be interpreted by a receiver of the digital image signal.

Signal and image processing frequently require converting input data into transform coefficients for the purposes of analysis. Often only a quantized version of the transform coefficients is needed, such as, for example, JPEG/MPEG data compression or audio/voice compression. Many such applications need to be done fast in real time such as the generation of JPEG data for high speed printers.

One compression technology defined in the JPEG standard, as well as other emerging compression standards, is discrete cosine transform (DCT) coding, wherein an input image is divided into many uniform image blocks with data samples in each, typically in an 8×8 array of data samples, to achieve image compression. Images compressed using DCT coding are decompressed using an inverse transform known as the inverse DCT (IDCT). A two-dimensional forward discrete cosine transform (FDCT) function is applied to each block to transform the data samples into a set of transform coefficients to remove the spatial redundancy.

In general, the forward transform will produce real-valued data, not necessarily integers. To achieve data compression, the transform coefficients are converted to integers by the process of quantization. The resulting integers are then passed on for possible further encoding or compression before being stored or transmitted.

The two basic components of an image compression/decompression system are the encoder and the decoder. The encoder compresses the "source" image (the original digital image) and provides an output of compressed data (or coded data). The compressed data may be either stored or transmitted, but at some point are fed to the decoder. The decoder recreates or "reconstructs" an image from the compressed data.

In general, a data compression encoding system may include three basic parts: an encoder model, an encoder statistical model, and an entropy encoder. The encoder model generates a sequence of "descriptors" that is an abstract representation of the image. The statistical model converts these descriptors into symbols and passes them on to the entropy encoder. The entropy encoder, in turn, compresses the symbols to form the compressed data. The encoder may require external tables. That is, tables specified externally when the encoder is invoked. Generally, there are two classes of tables; model tables that are needed in the procedures that generate the descriptors, and entropy-coding tables that are needed by the JPEG entropy-coding procedures.

JPEG uses two techniques for entropy encoding: Huffman coding and arithmetic coding. Similarly to the encoder, the decoder may include basic parts that have an inverse function relative to the parts of the encoder.

JPEG compressed data contains two classes of segments: entropy-coded segments and marker segments. Other parameters that are needed by many applications are not part of the JPEG compressed data format. Such parameters may be needed as application-specific "wrappers" surrounding the JPEG data; e.g., image aspect-ratio, pixel shape, orientation of image, etc.

Within the JPEG compressed data, the entropy-coded segments contain the entropy-coded data, whereas the marker segments contain header information, tables, and other information required to interpret and decode the compressed image data. Marker segments always begin with a "marker", a unique 2-byte code that identifies the functions of the segment.

To perform a display (or print or audio) operation, it may be necessary for the display device to scale an image to a larger or smaller size. The scaling of the images may be performed as a linear operation. The array of coefficients describing the intensity of the colors of the pixels of the image is transformed to an array of coefficients of the scaled image by a matrix operation.

This transformation may be performed in any representation of the image, but may depend on such a representation. As long as the representation is linear with respect to the pixel values the transformation stays linear.

The scale factor is a number which expresses the ratio of the number of samples in the image before and after the scaling. Usually the scaling is performed block-wise, where the size of the block (which may be the entire signal) is determined by the scale factor, the demanded efficiency of the operation and the quality of the resulting signal. Choosing larger blocks may yield better quality but lesser efficiency, because the larger blocks allows the scaling factor to be approximated more accurately. The scale factors with small integers as denominators and numerators allow smaller blocks, larger integers may force larger blocks.

The emphasis of the present invention is addressing high-end color printer performance for scaling operations. Currently, scaling a continuous tone JPEG image has a strong undesirable effect on the throughput of the printer. Conventional prior art image reduction processes typically involve doing an IDCT transform on each 8×8 DCT block to create real domain data (64 samples), reducing the image in the pixel domain, and then doing a FDCT to return to the DCT domain. The main problem with this approach is that it is computationally expensive. For full-page images the IDCT and FDCT calculations alone could exceed the total processing time available, particularly if the images are being reduced down to make them fit on a page.

In one reference incorporated above, "Reduction of N DCT blocks into One Block" by Trenary et al., a solution has been developed wherein one-dimensional DCT domain reduction methods merge N blocks along one dimension into one block, resulting in a significant transactional savings. This approach offers computationally efficient advantages in 1/n "downscaling" operations. However, where the same method and system is utilized in "up-scaling" operations, extra computational cycles are required, reducing efficiency advantages. Moreover, the extra computational cycles introduce additional opportunities for the occurrence of errors through additional "round-off" steps.

One area where both data transform and scaling operations are required is high impression-per-minute ("ipm") printing during "contone" (continuous tone; e.g., photographic) image scaling. The criticality of the problem increases as the printer speed is increased. What is needed is a computationally efficient system and method to provide transform and scaling operations in data processing, and more particularly in data transform operations that use scaled terms. More particularly, an improved system and method is required to address high-end color printer performance for scaling operations.

SUMMARY OF THE INVENTION

A method and system for efficient scaling in the transform domain, wherein transform coefficient data is provided as an input to a data processing system and scaled in the transform domain by application of a combined matrix. Some embodiments utilize discrete cosine transform data. One embodiment of the invention generates a combined matrix for one-dimensional scaling by selecting a rational scaling factor and matrix dimension value, generating a matrix with some zero values, applying a one-dimensional inverse transform, regrouping, and applying a one-dimensional forward transform. One application of the invention performs up-scaling operations, and another performs down-scaling operations. The invention also provides for two-dimensional scaling by selecting horizontal and vertical scaling parameters and generating first and second combined matrices responsive to the parameters and combining them into a single combined matrix. The invention may also incorporate a predetermined cost function.

BRIEF DESCRIPTION OF THE DRAWINGS

FIG. 1 is a diagram showing a block structure of scaling matrices according to the present invention with a down-scaling factor of ½.

FIG. 1A is a diagram showing the content of the blocks of the scaling matrices of FIG. 1.

FIG. 2 is a diagram showing a block structure of scaling matrices according to the present invention with a down-scaling factor of ¼.

FIG. 2A is a diagram showing the content of the blocks of the scaling matrices of FIG. 2.

FIG. 3 is a diagram showing a block structure of scaling matrices according to the present invention with an up-scaling factor of 2.

FIG. 3A is a diagram showing the content of the blocks of the scaling matrices of FIG. 3.

FIG. 4 is a diagram showing a block structure of scaling matrices according to the present invention with an up-scaling factor of 4.

FIG. 4A is a diagram showing the content of the blocks of the scaling matrices of FIG. 4.

DESCRIPTION OF THE PREFERRED EMBODIMENTS

Figure 5:
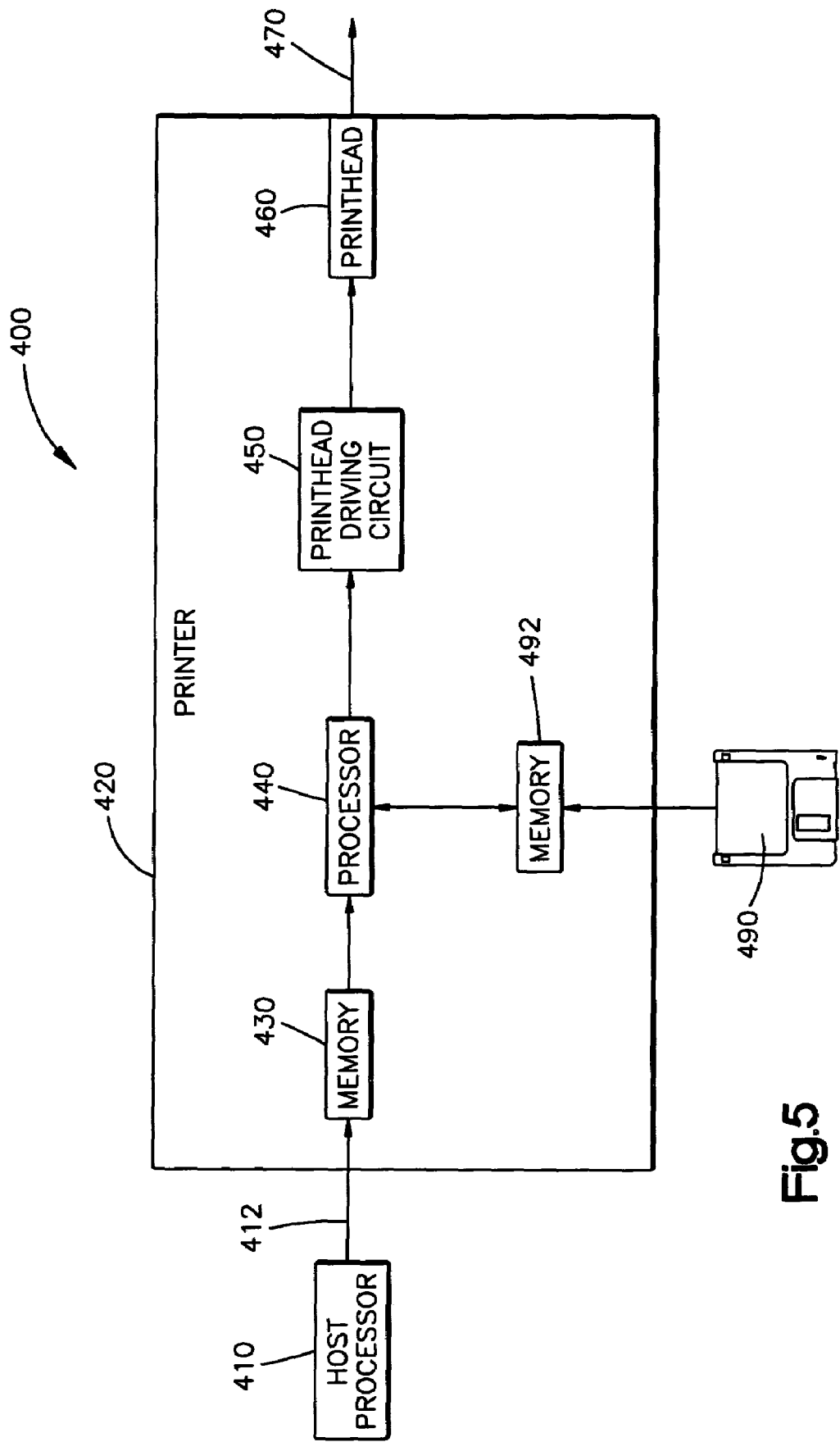
FIG. 5 illustrates an article of manufacture comprising a computer usable medium having a computer readable program according to the present invention embodied in said medium, as implemented in a printer.

A method and system for efficient scaling in the transform domain when transform domain data is provided as an input to a system, comprising scaling the transform domain data input in one combined matrix operation step in the transform domain. The invention relates in general to data processing, and more particularly to data transforms that use scaled terms. In illustrative embodiments of the present invention described herein the intended application is for high-end color printer performance for scaling operations, specifically a system and method that speeds scaling of JPEG images by using the structure of the scaling matrices, combined with the structure of the FDCT and IDCT transforms employed by JPEG, to create one composite transform that performs the scaling and "repackaging" of DCT coefficients into 8×8 blocks.

It is to be understood that although the present embodiments are intended for JPEG image applications that the present invention is not limited to such applications. It will be readily apparent to one skilled in the art that the present invention can be readily adapted to a wide variety of data processing tasks that require efficient scaling in the transform domain when the transform domain data is provided as an input to a system.

Because the contone images are received at the printer in JPEG format, they are already in the DCT domain, making this method very efficient, since it eliminates the need to transform the data back to the pixel domain prior to manipulation. Entropy coding must be removed from the data prior to application of an algorithm by the present invention; however, entropy coding must necessarily be removed from the data before subsequent processing in the printer anyway, so this requirement does not introduce additional operations.

Other prior art references, such as "Method and Apparatus for the Scaling Up of Data" by Trenary et al. and "Method and Apparatus for the Scaling Down of Data" by Mitchell et al. (both previously incorporated by reference) teach "scaling up" and "scaling down" through matrix operations. However, both of these references teach systems and methods wherein the actual cosines must be kept with the transform constants. What is important in the present invention is a computation-efficient implementation of the constants in the scaling matrix without the actual cosines.

An important advantage of the present invention is in how the matrices are constructed. Matrices used in prior art scaling use floating point or simple fixed point approaches, while the present invention uses the integer methods to directly address computational complexity. The integer methods utilized are taught in "Faster Transforms Using Scaled Terms" by Trelewicz et al, previously incorporated by reference. As taught by the present invention, integer computational optimization can also be used to reduce cache misses on computer system devices, such as modems and pipelined processors; to make efficient field programmable gate array (FPGA) hardware implementations for hardware systems; and to reduce computational cycles on a range of embedded processors for pervasive applications. Furthermore, contrast and image quality feed directly into the cost functions used for optimization of the matrices for computation, and are flexible for a range of applications.

The present invention may be described as an implementation of "one scaling transform", which can perform inverse transforms, scaling, and forward transforms combined into one matrix operation on multiple transform coefficient blocks. Thus scaling examples according to the present invention become specific cases of combined linear operations.

The present invention provides for significant advantages in both down-scaling and up-scaling of contone images.

Down-scaling. Scaling an image down requires low-pass-filtering of the image to avoid "aliasing", an effect in sampled signals and images where high frequency content becomes low frequency noise when the high frequency components exceed the Nyquist frequency of the resampled signal. The "Nyquist limit" is commonly defined as the highest frequency of input signal that can be correctly sampled, equal to half of the sampling frequency. However, in the DCT domain, the deletion of high-frequency coefficients (replacement with zero) is equivalent to high-quality low-pass-filtering. At this point, the zero high-frequency coefficients can be removed from the DCT block, forming a smaller block, for example "(n)×(n)". When an (n)×(n) IDCT is applied to this block, the down-sampled image results. However, it should be noted that such an operation can produce pixel-domain results out-of-range: for example, if the original samples were in the range 0-255, the scaled pixels, after application of the IDCT, can be smaller than 0 and/or larger than 255, requiring some type of operation to bring them back into range. This effect results from the mathematics of the DCT, and is predictable and reproducible.

Basic matrix structures for down-scaling by n/m where n<m, k=g(n)/m and M=m, are as follows:

(1) The matrix P is of the form: [[(n)×(n)][(n)×(m−n)]], where the [(n)×(m−n)] matrix is identically zero, but it will act on a matrix of the form [[(m)×(M)]$_1$ . . . [(m)×(M)]$_g$];
so we can assume its form to be:
[[[(n)×(n)][(n)×(m−n)]]$_1$ . . . [[(n)×(n)][(n)×(m−n)]]$_g$],
where each [(n)×(m×n)] matrix is zero;

(2) The inverse transform matrix d(n) of the form d(n)=[(n)×(n)] acts on the result of (1) (leaving its structure untouched) and then this result is regrouped using the relationship k(m)=g(n) to produce:
[[(m)×(M)]$_1$ . . . [(m)×(M)]$_k$];

(3) Then the forward transform matrix D(m) of the form D(m)=[(m)×(m)] acts on the result of (2).

Under the present invention this process can also be achieved equivalently one dimension at a time: From an initial (m)×(m) block creating an (n)×(m) block, repackaging, and then creating an (n)×(n) block, where m is the dimension value of an (m)×(m) matrix. Note that the present invention is illustrated scaling both dimensions equally. However, since each dimension is done independently, the result could be an (n')×(n) block where n' is not equal to n. Note that the collection of conceptual (n)×(n) blocks may be repackaged into a smaller number of (m)×(m) blocks as part of the combined matrix operation. One dimension could be scaled up and the other axis scaled down. As JPEG processing is particularly suited for manipulation of data in 8×8 blocks, it is intended that m=8 for JPEG imaging applications. However, other values of m may be selected for use with the present invention.

For example, an n/m scaling down along one axis may be performed according to the present invention through the following steps:

(a) Select g as the smallest integer such that (ng)/m is an integer k, (b) Define X to be an (mg)×(m) matrix of DCT coefficients formed by taking g (m)×(m) blocks;

(c) Define p as an (ng)×(m) matrix, built of g blocks of (n)×(m) equal matrices, which when applied will reject the highest m−n frequencies of each (m)×(m) block along the axis being scaled down one;

(d) Define $d_g$(n) as an (ng)×(n) IDCT transform (which is implemented by a matrix), consisting of g blocks of (n)×(n) IDCT transforms; and (e) Define $D_g$(n) as an (ng)×(m) FDCT matrix, consisting of ng/m blocks of (m)×(m) FDCT transforms for repackaging $d_g$(n)pX into ng/m (m)×(m) DCT blocks.

(f) Define S=$D_g$(n)$d_g$(n)p.

The SX operation outputs k blocks from the original g blocks. S, the combined matrix is a "sparse matrix": it has many zero entries. In one embodiment of the present invention the algorithm process taught by "Faster Transforms Using Scaled Terms" by Trelewicz et al, previously incorporated by reference, is employed to find optimal integer representations for the S matrix constants, with the common denominator q for the integer approximation operations being adjusted so that the resulting contrast is within a predetermined range of the original 100% contrast.

The common denominator q may be found according to the methods taught by J. Q. Trelewicz, Michael T. Brady and Joan L. Mitchell in "Efficient Integer Implementations For Faster Linear Transforms", in Proc. of 35th Asilomar Conf. on Signals, Systems, and Computers 2001, (Pacific Grove, Calif.), 4-7 Nov. 2001. There the common denominators used for the subtransforms are chosen according to a cost function tailored to the specific application and implementation architecture. For example, the cost function may take into account the number of bits available in the hardware for calculation, the amount of error that can be tolerated in a calculation, and the resulting complexity of the calculation on that architecture. Thus, the implementation of the transform with smaller constants can reduce the need for memory accesses, thus reducing cache misses. Although the present embodiment utilizes DCT transform structures, this architecture also works for other transforms. Moreover, even greater flexibility is provided using simultaneous rational approximations (i.e., a common denominator q) to all of the constants in a subtransform, since the simultaneous representations can be found in accordance with the cost function. In architectures preferring shifts and additions to multiplications, the numerators of the rational approximations may be viewed as polynomials in powers of 2 with plus/minus 1 or 0 coefficients.

In one embodiment a cost function finds simultaneous representations (numerators) with the smallest number of common power-of-2 terms; i.e., the set of power-of-2 terms in all of the polynomials in the representations of a subtransform is as small as possible. This formulation allows the power-of-2 terms to be grouped, so that the number of operations in the shift-and-add transform can be reduced. Using this cost function adjustment method for the integer approximation operation, the predetermined range may be chosen in the present invention so that representations for the matrix S cannot produce scaled DCT coefficients outside the preferred range. One preferred predetermined range of 80% to 120% of original contrast produces high-quality results.

Because of the way in which S is represented per the cost function, it is suited for efficient implementation in software or hardware, using the parallel processing methods of Mitchell et al., "System and Method for Enabling Multiple Signed Independent Data Elements per Register", previously incorporated by reference.

Scaling on the other axis is an extension of this method, by using the transpose of the matrices. FIG. 1 illustrates an example of down-scaling by ½ according to the present invention, and FIG. 2 illustrates an example of down-scaling by ¼ according to the present invention. Both examples are more fully discussed below.

Up-scaling. Scaling an image up cannot increase the frequency content of the image; i.e., only the lower frequencies already present in the image can be present in the larger-scale image, since no additional information is present in the image. Thus, in a similar manner to the down-scaling mentioned above, up-scaling can be achieved by increasing the size of the DCT block by inserting zero coefficients at the high frequencies to create, say, a (N)×(N) DCT block. An (N)×(N) IDCT then results in the up-scaled image.

Basic matrix structures for up-scaling by N/m where m<N and k=g(N)/m, are as follows:

(a) The matrix P is of the form: $[[(m)\times(m)][(N-m)\times(m)]]$, where the $[(N-m)\times(m)]$ matrix is all zeros, but it will act upon a matrix of the form $[[(m)\times(M)]_1 \ldots [(m)\times(M)]_g]$;
so we can assume its form to be:
$[[[(m)\times(M)][(N-m)\times(M)]]_1 \ldots [[(m)\times(M)][(N-m)\times(M)]]_g]$,
where each $[(N-m)\times(M)]$ submatrix is identically zero;
(b) The inverse transform matrix d(N) of the form $d(N)=[(N)\times(N)]$ acts on the result of (a) (leaving its structure unchanged) and then this result is regrouped using the relationship g(N)=k(m) as:
$[[(m)\times(M)]_1 \ldots [(m)\times(M)]_k]$;
(c) Then the forward transform matrix D(m) of the form $D(m)=[(m)\times(M)]$ acts on the result of (b).

In the same manner as scaling down, this process can also be achieved equivalently one dimension at a time; i.e., from a (m)×(m) block creating an (N)×(m) block, repackaging, and then creating an (N')×(N) block where N' and N are not necessarily equal. Note that the collection of conceptual (N)×(N) blocks may be repackaged into a larger number (m)×(m) blocks as part of the combined matrix operation. Therefore an N/m scaling up according to the present invention may be performed as follows:
(a) select g as the smallest integer wherein Ng/m is an integer k;
(b) define X, to be an (mg)×(m) matrix of DCT coefficients formed by taking g (m)×(m) blocks;
(c) define P, an (Ng)×(m) matrix, which thereby inserts zeros at the N−m high frequencies in one dimension in each (m)×(m) DCT-block;
(d) define $d_g(N)$, an (Ng)×(N) IDCT matrix consisting of g blocks of (N)×(N) IDCT transforms; and
(e) define $D_g(n)$, an (Ng)×(m) DCT matrix, consisting of Ng/m blocks of (m)×(m) FDCT transforms for repackaging $d_g(N)PX$ into Ng/m (m)×(m) DCT blocks.
(f) Define $S=D_g(N)d_g(N)P$, the combined matrix.

The SX operation outputs k blocks from the original g blocks. S is also a sparse matrix. FIG. 3 illustrates an example of up-scaling by a factor of 2 according to the present invention, and FIG. 4 illustrates an example of up-scaling by a factor of 4 according to the present invention. Both examples are more fully discussed below.

Examples of the Present Invention

Now with reference to FIGS. 1 and 1A, the structure of the matrix 2, labeled $S_{1/2}$, of scaling by factor ½ is illustrated. It has eight rows and sixteen columns and is split into four blocks 4: A, Z, A', Z, wherein each block 4 has eight rows and four columns. The second block 4b and the fourth block 4d, labeled Z, are equal and have all entries zero. The entries of the first block 4a labeled A are shown in FIG. 1A. The third block 4c labeled A' is a "checkerboard" matrix of the entries of the first block 4a labeled A. The generation of the checkerboard matrix block 4c is conventional, wherein block 4a is indexed by counting from 1 in both the horizontal and vertical directions. For example, assume a 2×2 matrix M with the following entries:

W X
Y Z

W is at 1,1; X at 1,2; Y at 2,1; and Z at 2,2. In order to generate a checkerboard matrix M', the corresponding entries of matrix M are adjusted wherein the sign of every element with an "odd,even" or "even,odd" index is flipped, but the "even,even" or "odd,odd" index are not flipped. So here, we would flip X and Y, but not W or Z, and accordingly matrix M' has the following entries:

$$\begin{matrix} W & -X \\ -Y & Z \end{matrix}$$

Now with reference to FIGS. 2 and 2A, the matrix 10 labeled $S_{1/4}$ is provided to illustrate down-scaling by factor ¼ according to the present invention. Matrix 10 has eight rows and thirty-two columns. It is split into 8 blocks 12: A, Z, B, Z, A', Z, B', and Z. The second, fourth, sixth and eighth blocks 12 labeled Z are equal, having eight rows and six columns with all entries zero. The blocks 12 labeled A, A', B, B' each have eight rows and two columns. The entries of blocks 12 labeled B and B' are the same except for sign changes according to the checkerboard pattern process described above, and the entries of blocks 12 labeled A and A' are also the same except for sign changes according the said checkerboard pattern process.

FIGS. 3 and 3A illustrate up-scaling by a factor of two according to the present invention. FIG. 3A shows an 8×8 matrix 20 A. The matrix 22 A' is generated from matrix 20 through the checkerboard process described above, and the two matrixes 20 and 22 are combined to form composite matrix 24, with sixteen rows and eight columns. The matrix 24 has a block structure, with the first eight rows forming the matrix A and the last eight rows forming the 8×8 matrix called A'. The entries of A' and A are the same except for the sign change in the checkerboard pattern as described above.

FIGS. 4 and 4A illustrate up-scaling by a factor of four according to the present invention. Matrix 30 is a 32×8 matrix, with thirty-two rows and eight columns, and has a block structure. The first eight rows are formed by the 8×8 matrix 32 labeled A. Rows nine through sixteen of matrix 30 are formed by 8×8 matrix 34 labeled B. Rows seventeen through twenty-four of matrix 30 are formed by the 8×8 matrix 36 B', which is generated from matrix 34 labeled B through the checkerboard process described above. And lastly, the last eight rows of matrix 30 are formed by the 8×8 matrix 38 labeled A'. Again, the entries of matrix 38 A' and matrix 32 A are the same except for the sign change in the checkerboard pattern.

In FIGS. 1A, 2A, 3A and 4A the entries of the labeled blocks are the fractions with denominator 32, and the multiplication by such matrices is treated as multiplication by the numerators which are integers 1,2 . . . ,31. Each multiplication is implemented as a sequence of shifts (i.e., multiplied by a power of 2), additions, or subtractions according to the sign of the entry and the methods taught in "System and Method for Enabling Multiple Signed Independent Data Elements per Register" by Mitchell et al., previously incorporated by reference. The division by 32 of the resulting sum is implemented as a shift right, after the calculation with the numerator is completed. The checkerboard symmetry of signs is exploited by precalculation of sums and differences of pairs of input data. For the description of the invention we assume that the scaling is done in the rows and hence the data is represented by 16 (for scale factor ½) or 32 (for scale factor ¼) rows of dequantizied data. The same method is employed for scaling the columns of data. Equivalently, columns could be scaled first, and rows second.

Referring now to FIG. 5, an embodiment of the invention described above may be tangibly embodied in a in a computer program residing on a computer-readable medium 490. The medium 490 may comprise one or more of a fixed and/or removable data storage device such as a floppy disk or a CD-ROM, or it may consist of some other type of data storage or data communications device. The computer program may be loaded into the memory 492 to configure the processor 440 for execution. The computer program comprises instructions which, when read and executed by the processor 440 causes the processor 440 to perform the steps necessary to execute the steps or elements of the present invention.

The foregoing description of the exemplary embodiment of the invention has been presented for the purposes of illustration and description. It is not intended to be exhaustive or to limit the invention to the precise forms disclosed. Many modifications and variations are possible in light of the above teaching. It is intended that the scope of the invention be limited not with this detailed description, but rather by the claims appended hereto.

What is claimed is:

1. A method for efficient scaling in the transform domain when transform coefficient data is provided as an input to a data processing system, comprising the steps of:
   providing transform coefficient data to the data processing system;
   generating a combined matrix for one-dimensional scaling; and
   the data processing system scaling data represented by the transform coefficient data in the transform domain by applying the combined matrix to said transform coefficient data;
   wherein generating the combined matrix comprises the steps of:
   selecting a rational scaling factor F;
   selecting a matrix dimension value m; and
   selecting a smallest integer g wherein (Fg)/m is an integer k;
   generating a first matrix operating on at least one (mg)× (m) matrix by:
      zeroing out at least one row or at least one column of said matrix; or
      inserting at least one row of zeros or at least one column of zeros into said matrix;
   generating a second matrix by applying a one-dimensional inverse transform to the first matrix; and
   generating a third matrix by regrouping said second matrix so that it is conceived of as being composed of k (m)×(m) matrices; and
   generating the combined matrix by applying a one-dimensional forward transform to said third matrix.

2. The method of claim 1, further comprising the steps selecting at least one common denominator q; and
   representing at least two terms in the combined matrix by integers whose ratios with the common denominator q are scaled approximations of the terms.

3. The method of claim 2, wherein the step of selecting the common denominator q comprises choosing q according to a predetermined cost function.

4. The method of claim 3, wherein the predetermined cost function comprises the step of selecting the common denominator q so that the largest error on any transform coefficient is no larger than a predetermined error percentage.

5. The method of claim 1, wherein the step of applying a one-dimensional forward transform to the third matrix comprises applying a discrete cosine transform, and the step of generating the second matrix by applying a one-dimensional inverse transform to the first matrix comprises applying discrete cosine transform.

6. The method of claim 1 wherein the scaling is a down-scaling operation;
the step of selecting the rational scaling factor F comprises selecting F between 0 and 1; and
the step of generating the first matrix is the step of zeroing out at least one row or at least one column of said matrix.

7. The method of claim 1 wherein the scaling is an up-scaling operation;
the step selecting the rational scaling factor F comprises selecting F larger than 1; and
the step of generating the first matrix is the step of inserting the at least one row of zeros or the at least one column of zeros into said matrix.

8. The method of claim 1 wherein the matrix dimension value m is 8.

9. A method for efficient scaling in the transform domain when transform coefficient data is provided as an input to a data processing system, comprising the steps of:
providing transform coefficient data to the data processing system;
generating a combined matrix for two-dimensional scaling; and
the data processing system scaling data represented by the transform coefficient data in the transform domain by application of the combined matrix to said transform coefficient data simultaneously in two-dimensions;
wherein generating the combined matrix for two-dimensional scaling comprises the steps of:
selecting horizontal scaling parameters Fh, mh and gh;
selecting vertical scaling factors Fv, mv, and gv;
generating a first combined matrix for horizontal scaling using parameters Fh, mh, and gh;
generating a second combined matrix which operates on said first combined matrix using parameters Fv, mv, and gv; and
combining the first and second matrices into a single combined matrix.

10. The method of claim 9, further comprising the steps of:
selecting at least one common denominator q; and
representing at least two terms in the combined matrix by integers whose ratios with the common denominator q are scaled approximations of the at least two terms.

11. A method for efficient scaling in the transform domain when transform coefficient data is provided as an input to a data processing system, comprising the steps of:
providing transform coefficient data to the data processing system; and
the data processing system scaling data represented by the transform coefficient data in the transform domain by application of a combined matrix to said transform coefficient data by the steps of:
determining first and second precisions to be allocated in a single register to hold respective first and second signed data elements;
packing the first and second elements into the register;
operating on the first and second elements;
determining third and fourth precisions to be allocated in the single register to hold respective third and fourth signed data elements, at least one of the first and third precision being different from each other, and the second and fourth precisions being different from each other;
packing the third and fourth elements into the register;
operating on the third and fourth elements; and
the register sending plural data elements simultaneously to at least one computational subsystem.

12. The method of claim 11, wherein the operating steps of operating on the first and second elements and operating on the third and fourth elements comprise multiplying by a constant or by a variable of known precision, or an addition, or a shift-left logical, or a subtraction, or a bitwise AND, or a bitwise OR.

13. A data processing system for efficient scaling in the transform domain when transform coefficient data is provided as an input, comprising:
transform coefficient data; and
a processor means configured to process scaling data represented by the transform coefficient data in the transform domain by application of a combined matrix configured for one-dimensional scaling to said transform coefficient data, the combined matrix defined by:
a rational scaling factor F;
a matrix dimension value m; and
a smallest integer g wherein (Fg)/m is an integer k;
a first matrix formed from at least one (mg)×(m) matrix by:
zeroing out at least one row or at least one column of said matrix; or
inserting at least one row of zeros or at least one column of zeros into said matrix;
a second matrix formed by applying a one-dimensional inverse transform to the first matrix; and
a third matrix formed by regrouping said second matrix so that it is conceived of as being composed of k (m)×(m) matrices; and
wherein the combined matrix is generated by applying a one-dimensional forward transform to said third matrix.

14. The data processing system of claim 13, wherein the combined matrix is further defined by:
at least one common denominator q; and
wherein at least two terms in the combined matrix are represented by integers whose ratios with the common denominator q are scaled approximations of the at least two terms.

15. The data processing system of claim 13 wherein the second matrix forward transform is a discrete cosine transform, and the combined matrix inverse transform is a discrete cosine transform.

16. The data processing system of claim 13 wherein the processor means is configured to process scaling data by down-scaling;
the rational scaling factor F has a value between 0 and 1; and
wherein the first matrix step is formed by zeroing out at least one row or at least one column of said (mg)×(m) matrix.

17. The data processing system of claim 13 wherein the processor means is configured to process scaling data by up-scaling;
the rational scaling factor F has a value larger than 1; and
wherein the first matrix step is formed by inserting at east one row of zeros or at least one column of zeros into said (mg)×(m) matrix.

18. The data processing system of claim 13 wherein the matrix dimension value m is 8.

19. A data processing system for efficient scaling in the transform domain when transform coefficient data is provided as an input, comprising:
  transform coefficient data; and
  a processor means configured to process scaling data represented by the transform coefficient data in the transform domain by application of a combined matrix to said transform coefficient data simultaneously in two-dimensions, wherein the combined matrix for two-dimensional scaling is defined by:
  horizontal scaling parameters Fh, mh and gh;
  vertical scaling factors Fv, mv, and gv;
  a first combined matrix for horizontal scaling generated from parameters Fh, mh, and gh;
  a second combined matrix generated from operating on said first combined matrix using parameters Fv, mv, and gv; and
  a single combined matrix generated by combining the first and second matrices.

20. The data processing system of claim 19, wherein the combined matrix for two-dimensional scaling is further defined by:
  at least one common denominator q; and
  wherein at least two terms in the combined matrix are represented by integers whose ratios with the common denominator q are scaled approximations of the at least two terms.

21. A data processing system for efficient scaling in the transform domain when transform coefficient data provided as an input, comprising:
  a processor means configured to process scaling data represented by the transform coefficient data in the transform domain by application of a combined matrix to said transform coefficient data;
  a single register; and
  a computational subsystem;
  wherein the processor means is configured to define the combined matrix by selecting a scaling term g according to a predetermined cost function so that the largest error on any transform coefficient is no larger than a predetermined error percentage;
  wherein the combined matrix is defined by first, second, third and fourth transforms and the processor means is configured to:
  determine first and second precisions to be allocated in the single register to hold respective first and second signed data elements;
  pack first and second signed data the elements into the register;
  operate on the first and second signed data elements;
  determine third and fourth precisions to be allocated in the single register to hold respective third and fourth signed data elements, at least one of the first and third precision being different from each other, and the second and fourth precisions being different from each other;
  pack the third and fourth elements into the register; and
  operate on the third and fourth elements; and
  wherein the register is configured to send plural data elements simultaneously to the at least one computational subsystem.

22. The data processing system of claim 21, wherein the processor means is further configured to apply the first, second, third and fourth transforms by operating on the first, second, third and fourth elements by multiplication by a constant or by a variable of known precision, or by an addition, or by a shift-left logical, or by a subtraction, or by a bitwise AND, or by a bitwise OR.

23. An article of manufacture comprising a computer-readable medium having a computer-readable program embodied in said medium, wherein the computer-readable program, when executed on a computer, causes the computer to scale data represented by transform coefficient data in the transform domain by application of a combined matrix for one-dimensional scaling to said transform coefficient data, by:
  selecting a rational scaling factor F;
  selecting a matrix dimension value m;
  selecting a smallest integer g wherein (Fg)/m is an integer k;
  generating a first matrix operating on at least one (mg)×(m) matrix by:
    zeroing out at least one row or at least one column of said matrix; or
    inserting at least one row of zeros or at least one column of zeros into said matrix;
  generating a second matrix by applying a one-dimensional inverse transform to the first matrix;
  generating a third matrix by regrouping said second matrix so that it is conceived of as being composed of k (m)×(m) matrices; and
  generating the combined matrix by applying a one-dimensional forward transform to said third matrix.

24. An article of manufacture comprising a computer-readable medium having a computer-readable program embodied in said medium, wherein the computer-readable program, when executed on a computer, causes the computer to scale data represented by transform coefficient data in the transform domain by application of a combined matrix for two-dimensional scaling to said transform coefficient data, by:
  selecting horizontal scaling parameters Fh, mh and gh;
  selecting vertical scaling factors Fv, mv, and gv;
  generating a first combined matrix for horizontal scaling using parameters Fh, mh, and gh;
  generating a second combined matrix which operates on said first combined matrix using parameters Fv, mv, and gv; and
  combining the first and second matrices into a single combined matrix.

* * * * *